3,201,264
SMOKEHOUSE METHOD
Harvey R. Rasmussen and Harvey J. Rasmussen, Lodi, George W. Fisher, Sun Prairie, and Le Roy G. Moskal, Lodi, Wis., assignors to Alkar Engineering Corporation
Original application Apr. 9, 1962, Ser. No. 185,973. Divided and this application Feb. 1, 1965, Ser. No. 429,329
6 Claims. (Cl. 99—229)

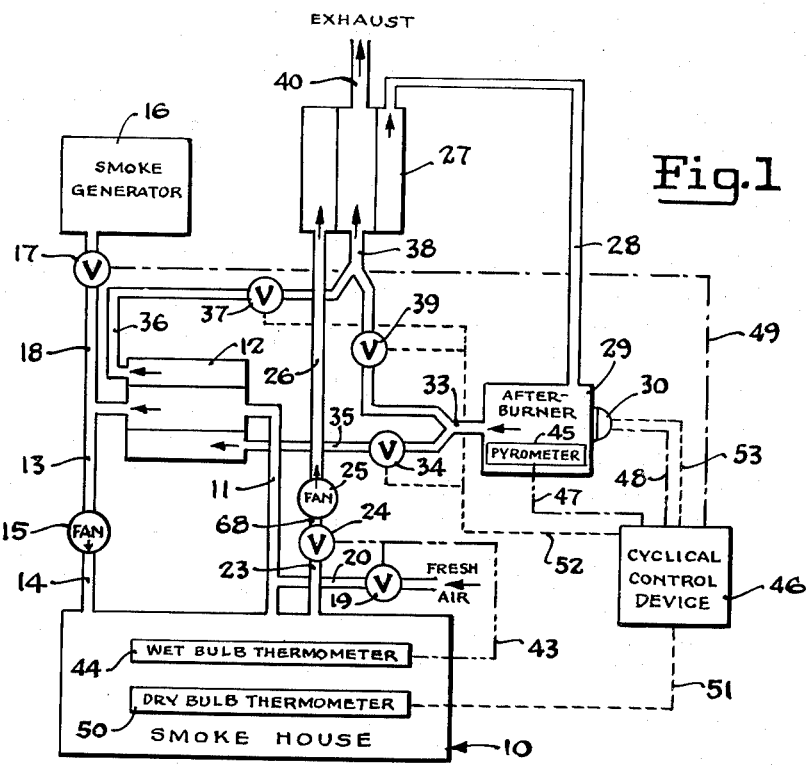
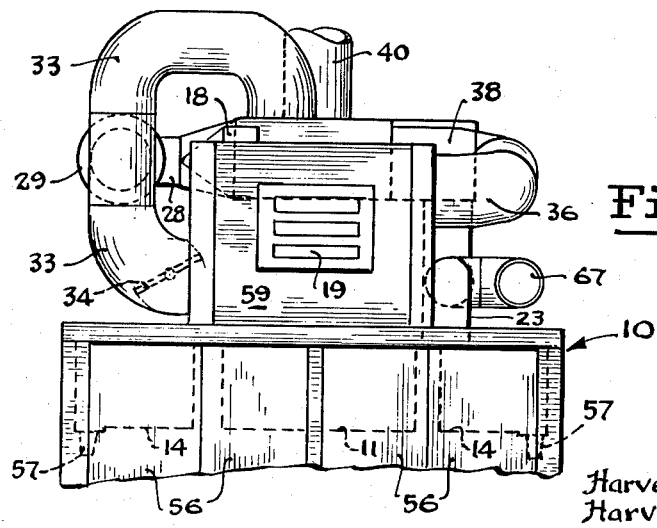

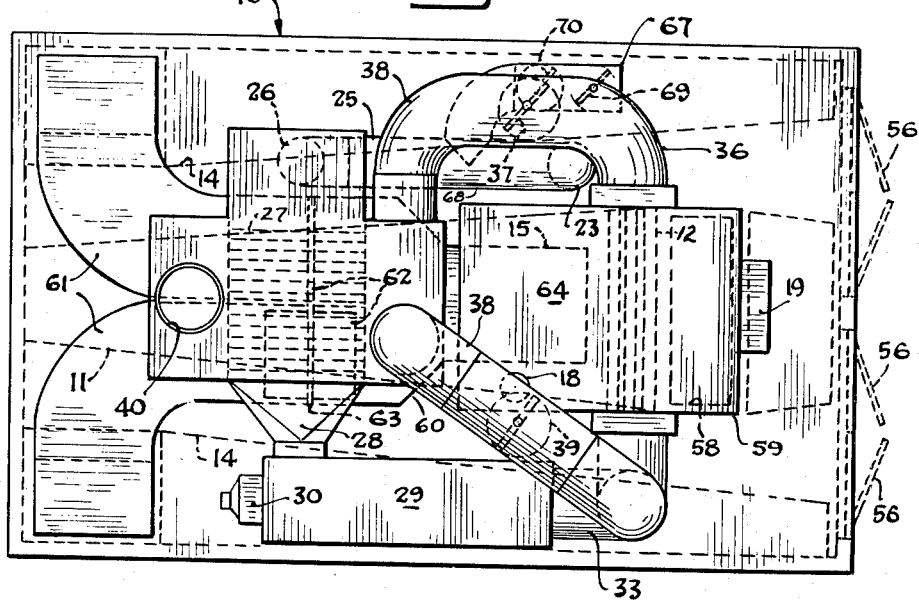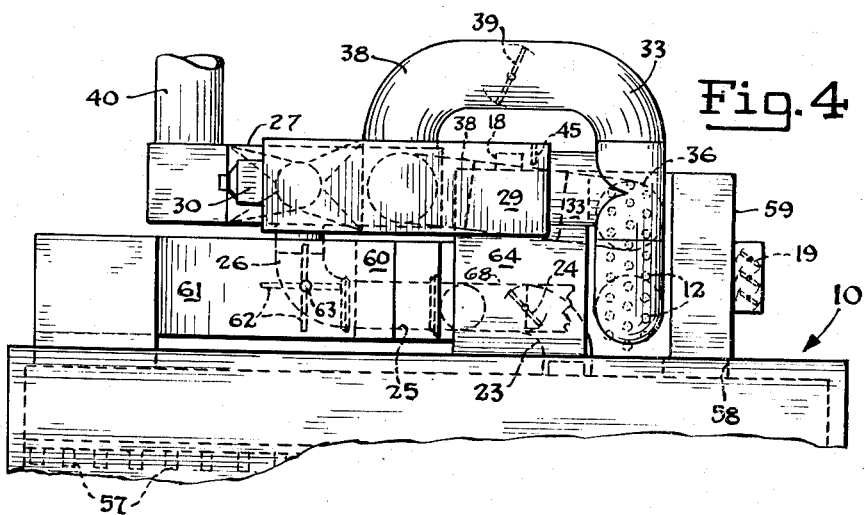

This application is a division of our prior application, Serial No. 185,973 filed Apr. 9, 1962.

The present invention relates to a method for economically conditioning the air in a food smokehouse or the like and for ameliorating the problem of air pollution attendant the smoking of food products.

Numerous food products are precooked and smoked prior to their distribution to consumers. Examples of such products would include sausage, ham, bacon, fish, etc. The products to be so processed are put in an enclosure, e.g., a smokehouse, which is heated to the desired cooking temperature. The exact temperatures are conventional and form no part of the present invention. Usually the temperatures will be in a range of from about 100° F. to 180° F., and often they are gradually increased during the cooking process.

During a part of the cooking process, smoke is introduced into the enclosure to give the product the desired flavor and appearance. In order to control the humidity in the smokehouse for proper processing of the food products, it is necessary to discharge some of the air from the smokehouse and replace it with air having a lower moisture content. Communities taking active steps toward the elimination of air pollution object to the discharge of the smoke from smokehouses into the atmosphere. In those communities it is necessary that the air from the smokehouse, at least during the smoking cycle, be processed to substantially eliminate the smoke therefrom. While this can be performed in several ways, the most often used procedure is to heat the smoke laden air to a temperature sufficient to oxidize the smoke particles, e.g., carbon, and thus eliminate the smoke. Heating of the smoke laden air to a temperature of about 1200° F. usually is considered sufficient.

Such purification of the smoke laden air by heat poses problems. First and most obvious is the fuel expense required to heat the air to such a high temperature. This can be a very substantial factor of added cost in the operation of a smokehouse. The equipment to perform this operation will appreciably increase the equipment investment. Furthermore discharging all the additional heat into the atmosphere is undesirable in the usual area in which air pollution problems are prevalent.

The principal object of our invention is to provide a method for conditioning the air of smokehouses and for economically controlling smoke discharge to comply with the requirements in those areas in which limitations on air pollution are established. While our process contemplates the heating of the air to eliminate the smoke therefrom, we achieve very substantial savings over the conventional processes in which the corresponding smoke abatement operations are performed. Furthermore, the treated air discharged at atmosphere is at a greatly reduced temperature as compared to conventional methods and equipment. We achieve a reduced investment in equipment since we utilize a single burner both for heating the smokehouse to the desired food processing temperature and for elimination of the smoke from the air discharged to atmosphere from the smokehouse.

While embodiments of our invention may be manually controlled our invention is such that is ideally suited for incorporation in an automated smokehouse processing. By automatically controlling his equipment, a food processer can insure that every batch of product is treated in an identical manner. Thus, quality can be controlled to a desired standard. Furthermore, the employees can be engaged in productive operations and will not have to spend time watching equipment to see that the desired cycle of processing is maintained.

Further objects and advantages will become apparent from the following description taken in conjunction with the drawings in which:

FIGURE 1 is a diagrammatic illustration of an embodiment of our invention;

FIGURE 2 is an end elevation of a smokehouse embodying our invention;

FIGURE 3 is a plan view of the embodiment of FIGURE 2; and

FIGURE 4 is a side elevation of the same embodiment.

INTENTION

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

METHOD

The method of our invention contemplates the use of a single burner to heat the smokehouse and to heat the air to a temperature sufficient to oxidize the smoke particles. When smoke is present the air discharged from the smokehouse is heated in the burner to a temperature sufficient to substantially eliminate the smoke. The heated air from the burner is used first to heat the air in the smokehouse to the desired processing temperature. To do this, air from the smokehouse is brought into heat exchange relationship with the heated air from the burner. This step can effectively and simply be performed by a heat exchanger, relatively nominal in cost. During the smoking portion of the cycle, the burner temperature will be much higher than the desired temperature for processing in the smokehouse. Therefore, during that portion of the cycle we only use a portion of the heated air from the burner to heat the smokehouse by heat exchange as just set forth. During the portion of the cycle when no smoke is present the burner may be operated at a much lower temperature and all of the air from the burner is brought into heat exchange relationship with the smokehouse air.

In either event the heated air from the burner, after being utilized to heat the smokehouse is used to preheat the exhaust air being withdrawn from the smokehouse before that latter air is introduced into the burner. To the extent that there is heat in the air from the burner, not used to heat the smokehouse, that heat is used for preheating the air prior to its entering the burner. The preheating is performed by a heat exchange step. Again an effective and relatively inexpensive heat exchanger may be employed. The heat exchange step achieves two substantial advantages. In the first place heat is recovered from the exhaust gases and used to preheat the air withdrawn from the smokehouse before it is introduced into the burner. By raising the temperature of the air before it is introduced into the burner, less fuel is required to raise the temperature of the air in the burner. The second important advantage is that heat is withdrawn from the exhaust air before it is discharged to atmosphere. Thus, there is less heat discharged into the atmosphere, a factor which is considered significant in many air pollution control districts.

ILLUSTRATIVE PROCESS

FIGURE 1 diagrammatically illustrates the use of our invention in connection with a smokehouse 10 for the processing of food. To heat the air in the smokehouse to the desired processing temperature a quantity of air is withdrawn from the smokehouse through a duct 11, passed through a heat exchanger 12 and returned to the smokehouse through ducts 13 and 14. This air movement is achieved by means of a fan or blower 15. When smoke is to be added, it is brought from a smoke generator 16 through a valve 17 and a duct 18 communicating with duct 13. To the extent that fresh air is required, it is introduced through a valve 19 to a duct 20 communicating with duct 11. In general the "valves" mentioned herein will comprise a damper or a plurality of dampers positioned in the ducts to control the rate of flow of fluid through the duct.

The air from the smokehouse which is to be discharged to atmosphere is withdrawn from the smokehouse through a duct 23 through a valve 24 by means of a fan or blower 25. From blower 25 the exhaust air travels through duct 26 to a heat exchanger 27. From heat exchanger 27 the exhaust air travels through a duct 28 to an afterburner 29. Afterburner 29 includes a burner unit 30 which preferably is gas fired.

The heated air from the burner 29 may travel through a duct 33, valve 34 and duct 35 to heat exchanger 12. From heat exchanger 12 that heated air would pass through a duct 36, valve 37 and duct 38 to heat exchanger 27. Alternatively, the heated air from the afterburner 29 may travel through duct 33 and valve 39 to duct 38 and heat exchanger 27. From heat exchanger 27 the air is exhausted to atmosphere through a stack 40.

The humidity of the air in smokehouse 10 is controlled by introducing dry fresh air through valve 19 and withdrawing the moisture laden air through valve 24. As indicated by line 43, valves 19 and 24 are controlled by a wet bulb thermometer 44 so as to achieve the necessary air circulation to maintain the desired humidity in the smokehouse.

During the smoking part of the cycle, smoke valve 17 will be opened and burner 30 will be operated to achieve the desired temperature within afterburner 29 so as to oxidize the smoke entering the afterburner through duct 28. A pyrometer 45 measures the temperature in the afterburner 29. It is connected to a cyclical control device 46 as indicated by control line 47. During the smoking part of the cycle, cyclical control device 46 maintains the operation of burner 30 in response to the temperature indicated by pyrometer 45. This is illustrated by control line 48 from cyclical control device 46 to burner 30. In addition of course, the cyclical control device opens valve 17 during the same period as indicated by control line 49.

A dry bulb thermometer 50 measures the temperature within smokehouse 10. As indicated by control lines 51 and 52, it adjusts the setting of valves 34, 37 and 39 to achieve the requisite flow through heat exchanger 12 (as hereinafter described) to heat the air being circulated by fan 15 to a degree sufficient to maintain the desired air temperature in the smokehouse. In addition, during the non-smoking portion of the cycle, control of burner 30 is taken away from pyrometer 45 and the operation of the burner being maintained in response to the temperature measured by dry bulb thermometer 50. This is indicated by control line 53 from the cyclical control device 46 to burner 30.

As already mentioned, during the smoking portion of the cycle the operation of afterburner 29 is carried out to maintain a given temperature within the burner. The temperature selected is that deemed necessary to at least substantially oxidize the smoke particles entering the afterburner through duct 28. Pyrometer 45 sees that this temperature, e.g. 1200° F., is maintained. The exhaust air in duct 33 will be much hotter than is necessary to heat the smokehouse 10. Thus valves 34 and 37 will be opened to a rather minor extent with valve 39 being rather wide open. When the air temperature in the smokehouse drops below the desired temperature, this will be signified by dry bulb thermometer 50 opening valves 34 and 37 to a greater degree and closing valve 39 to a corresponding extent. Thus additional quantities of the heated air from duct 33 will pass through heat exchanger 12 to heat the air being circulated by fan 15.

Before being exhausted to atmosphere, the heated air from duct 33 is introduced into heat exchanger 27 through 38. In heat exchanger 27 the hot exhaust gases are reduced in temperature and correspondingly the air being withdrawn from the smokehouse by fan 25 is heated before it enters duct 28 leading to afterburner 29.

During the non-smoking portion of the cycle, of course valve 17 will be closed. At the same time control of afterburner 30 is transferred from pyrometer 45 to dry bulb thermometer 50. During this portion of the cycle, valve 39 will remain closed and valves 34 and 37 will be open. All of the heated air from afterburner 29 will pass through heat exchanger 12 before going to heat exchanger 27. Burner 30 is operated at a substantially lower fuel consumption with only sufficient heat being supplied to maintain the desired temperature in smokehouse 10.

From the foregoing description it will be noted that only one burner is required both to heat the smokehouse and to oxidize the smoke particles before they are discharged to atmosphere. Such an embodiment will reduce the operating cost, fuel consumption, to less than 25% of the cost of operation of conventional equipment. An important factor in this saving is the recovery of heat from the exhaust gases before they are discharged to atmosphere. As already mentioned herein, this heat recovery has the desirable function of reducing the temperature of the gases discharged to atmosphere.

ILLUSTRATIVE INSTALLATION

FIGURES 2–4 illustrate a portion of a smokehouse embodying our invention. In the main the same numbers have been used for the various elements as were used in FIGURE 1. The smokehouse 10 has a plurality of doors 56 to provide access to permit products to be inserted into and removed from the smokehouse. Along each side of the smokehouse are air discharge ducts 14. Each of these ducts has a plurality of nozzles 57 spaced therealong to provide an even distribution of the air entering the smokehouse. The air is withdrawn from the smokehouse to be heated through a duct 11 extending centrally the length of the smokehouse. Duct 11 has a plurality of spaced openings (not shown) therealong through which the smokehouse air is drawn into the duct.

The air from duct 11 is drawn through an opening 58 into a plenum 59. Air intake valve 19 communicates with plenum 59. The air from duct 11 passes through heat exchanger 12 and into blower 15. From blower 15 the air goes into a distribution duct 60. Duct 60 has two legs 61 each communicating with one of intake ducts 14. A pair of dampers 62 are mounted 90° out of phase on a power driven rotating shaft 63. As dampers 62 rotate they alternately open and close each of legs 61. Thereby the heated air from blower 15 is alternately directed to the ducts 14 at the opposite sides of the smokehouse. Smoke from a generator (not shown) is introduced into the housing 64 which contains heat exchanger 12 and blower 15 through a pipe 18.

The exhaust air is withdrawn through an opening in the top of the smokehouse and enters duct 23. After passing damper 24 and fan 25, the exhaust air enters heat exchanger 27 through duct 26. A duct 67 is provided for make-up air in the exhaust line. Duct 67 communicates with duct 68 between valve 24 and fan 25. Two valves 69 and 70 are received in duct 67. Valve 70 is automatically controlled in conjunction with valve 24. Valve 69 is a manually adjustable, balancing damper. In some instances particularly if the humidity in smokehouse 10 is relatively low, valve 19 will be substantially closed. At this time insufficient air will be drawn through ducts 26 and 28 by fan 25 to properly sustain combustion in afterburner 29. Under these circumstances valve 70 automatically will be opened to admit fresh air into the exhaust line to sustain combustion in the afterburner. As the humidity in the smokehouse rises, valve 19 will be opened and valve 70 will be closed by the wet bulb thermometer 44. With valve 19 open to a substantial extent, there is no further necessity for make-up air to achieve the required combustion in afterburner 29.

From heat exchanger 27 the exhaust air goes to the afterburner 29 through duct 28. Duct 33 out of the afterburner has two branches one of which goes overhead to duct 38 and heat exchanger 27. Valve 39 is located in this overhead duct. The other branch of duct 33 goes downwardly to heat exchanger 12. From heat exchanger 12 the exhaust air goes to heat exchanger 27 through ducts 36 and 38. Valve 37 is located therein. After traversing heat exchanger 27 the exhaust gases go out stack 40.

We claim:
1. The method of heating and smoking foods in an enclosure without discharging substantial quantities of smoke into the atmosphere including the steps of: introducing smoke into the enclosure; recirculating the air of the enclosure; withdrawing a portion of the air and smoke from the enclosure; heating said portion to a temperature sufficient to substantially eliminate the smoke from the portion; and using said heated portion to heat by heat exchange the recirculated air and to preheat the portion withdrawn from the enclosure before it is heated to said temperature.

2. The method of maintaining a given temperature in an enclosure while cooking and smoking foods therein and of preventing the discharge of substantial quantities of smoke into the atmosphere, including the steps of: introducing smoke into the enclosure; withdrawing air from the enclosure and recirculating said air back into the enclosure; withdrawing a portion of the air and smoke from the enclosure; heating said portion to a predetermined temperature sufficient to substantially eliminate the smoke from the portion; utilizing a part of said heated portion to heat the recirculated air; varying the amount of said part in response to the requirements for the amount of heat needed to maintain said given temperature; cooling the portion after it is heated to said temperature, by heat exchange with said portion before it has been heated to said predetermined temperature to produce a cooled exhaust gas from said portion and to recover heat from said exhaust gas before it is discharged; and discharging said exhaust gas to atmosphere.

3. The method of reducing air pollution while cooking and smoking foods in a smokehouse using an afterburner and two heat exchangers, including the steps of: withdrawing air and smoke from the smokehouse, passing it through one heat exchanger and into the afterburner; heating said air and smoke in the afterburner to a temperature sufficient to substantially eliminate the smoke therefrom; passing at least a portion of the heated air through a second heat exchanger, the first heat exchanger and exhausting it to atmosphere; passing the remainder of said portion, if any, through said first heat exchanger and exhausting it to atmosphere; and withdrawing air from the smokehouse, passing it through the second heat exchanger and returning it to the smokehouse.

4. The method of heating and smoking foods in an enclosure without discharging substantial quantities of smoke into the atmosphere including the steps of: withdrawing air and smoke from the enclosure; heating it to a temperature sufficient to substantially eliminate the smoke therefrom and discharging it to atmosphere; and recovering heat from said air before it is discharged to supply the heat requirements of the smokehouse and to supply a portion of the heat requirements to heat said air to said temperature.

5. The method of processing foods in a smokehouse including one cooking cycle and another cooking cycle in which additionally the food is smoked, using an afterburner and two heat exchangers, said method including the steps of: withdrawing air from the smokehouse; passing it through one heat exchanger and into the afterburner; heating said air in the afterburner; passing at least part of the heated air through a second heat exchanger, then the first heat exchanger and exhausting it to atmosphere; extracting air from the smokehouse, passing it through the second heat exchanger to heat it and returning it to the smokehouse; during the one cooking cycle, supplying only sufficient heat to the withdrawn air to heat the extracted air to a degree sufficient to maintain the desired temperature in the smokehouse; and during the other cycle, introducing smoke into the smokehouse, supplying sufficient heat to the withdrawn air to substantially eliminate the smoke therein, and controlling the temperature of the smokehouse by limiting the amount of the heated air from the afterburner that is supplied to the second heat exchanger to heat the extracted air.

6. The method of processing foods in a smokehouse including one cooking cycle and another cooking cycle in which additionally the food is smoked, using an afterburner and a heat exchanger, said method including the steps of: withdrawing air from the smokehouse and introducing it into the afterburner; heating said air in the afterburner; passing at least part of the heated air through the heat exchanger; extracting air from the smokehouse, passing it through the heat exchanger to heat it and returning it to the smokehouse; during the one cooking cycle, supplying only sufficient heat to the withdrawn air to heat the extracted air to a degree sufficient to maintain the desired temperature in the smokehouse; and during the other cycle, introducing smoke into the smokehouse, supplying sufficient heat to the withdrawn air to substantially eliminate the smoke therein, and controlling the temperature of the smokehouse by limiting the amount of the heated air from the afterburner that is supplied to the heat exchanger to heat the extracted air.

References Cited by the Examiner
UNITED STATES PATENTS

| | | | |
|---|---|---|---|
| 2,237,054 | 4/41 | Jensen | 99—259 |
| 2,312,339 | 3/43 | Jones | 99—259 |
| 2,352,590 | 6/44 | Trinkle | 99—229 |
| 2,380,428 | 7/45 | Gilliam | 99—259 |
| 2,596,381 | 5/52 | Doty | 99—229 |
| 2,732,837 | 1/56 | Porwancher et al. | |
| 3,069,997 | 12/62 | Julian | 99—259 |
| 3,069,998 | 12/62 | Julian | 99—259 |
| 3,113,870 | 12/63 | Barnett et al. | 99—229 X |

A. LOUIS MONACELL, *Primary Examiner.*